United States Patent Office 3,273,212
Patented Sept. 20, 1966

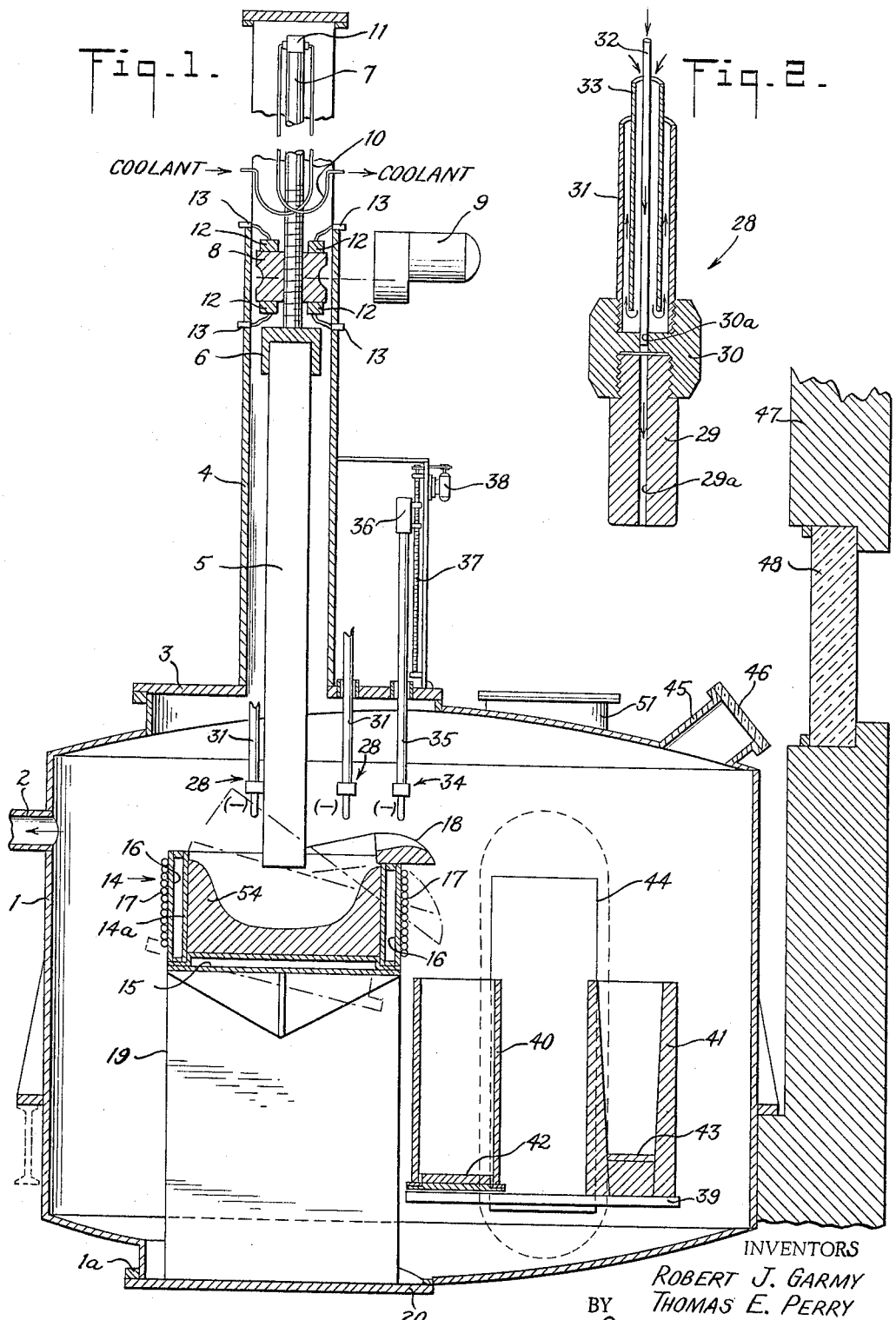

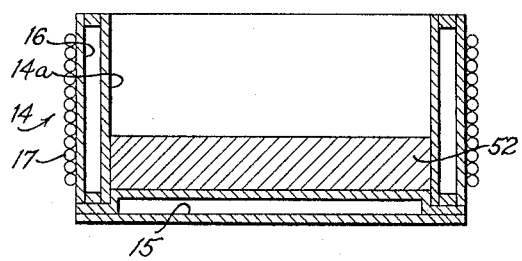
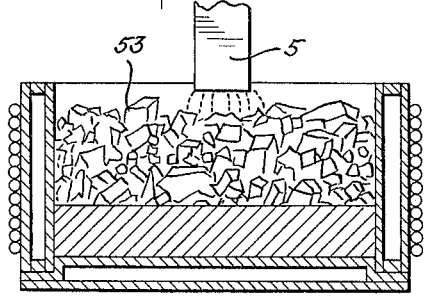
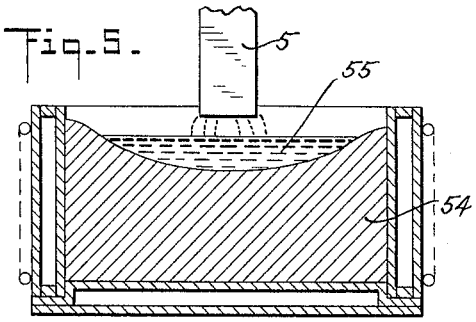
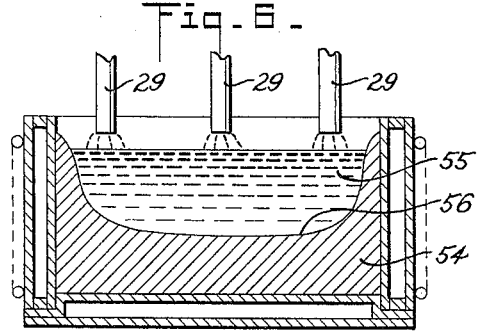
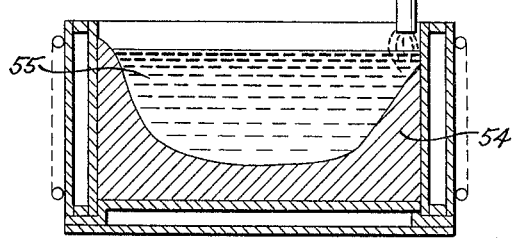
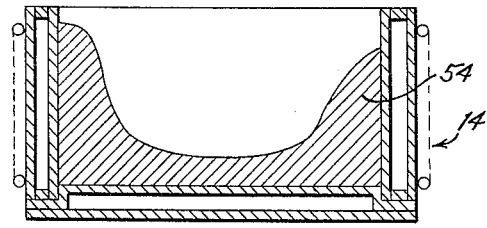
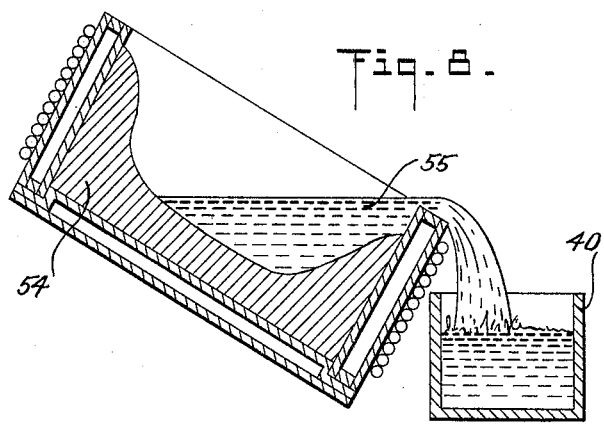

3,273,212
METHOD OF OPERATING AN ELECTRIC FURNACE
Robert J. Garmy, Canton, and Thomas E. Perry, North Canton, Ohio, assignors to Republic Steel Corporation, Cleveland, Ohio, a corporation of New Jersey
Original application Jan. 16, 1959, Ser. No. 787,266, now Patent No. 3,108,151, dated Oct. 22, 1963. Divided and this application Aug. 1, 1963, Ser. No. 299,306
3 Claims. (Cl. 22—200)

This application is a division of our copending application, Serial No. 787,266, filed January 16, 1959, now U.S. Patent No. 3,108,151, issued October 22, 1963 entitled, "Electric Furnace."

The present invention relates to a method for forming ingots. This method was devised particularly for use in connection with titanium and other similar meltable materials which have high melting points and a chemical affinity for an atmospheric gas, such as oxygen, when heated to the neighborhood of their melting point. However, the method is not necessarily limited to use with such materials, but may be used to advantage with other materials, e.g., steel, whenever an ingot of high purity is desired.

The prior art methods of making titanium have been adapted to use as raw materials either titanium sponge, as in the apparatus disclosed in U.S. Patent No. 2,800,519, issued to Robert J. Garmy on July 23, 1957, or to use consumable electrodes formed of compressed sponge, as in the apparatus described in U.S. Patent No. 2,973,452 issued to Robert J. Garmy on February 28, 1961. The adaptability of such apparatus to the use of scrap titanium is limited. In fact, so far as is known, there has been no practical process, prior to the present one, which was adaptable to the use, as a raw material constituting the entire initial charge, of scrap titanium in all of the many forms in which scrap is produced industrially. This lack of ability to utilize scrap has kept the prices of titanium and other such materials at high levels, and has limited adaptation to many commercial uses.

An object of the present invention is to provide a method for forming ingots of titanium and the like which is capable of using as a raw material titanium scrap in practically any form.

Another object is to provide an improved method of melting scrap metal, which method is adaptable for use with difficultly meltable metals such as titanium, zirconium and the like.

Another limitation of the prior art methods for producing ingots of titanium and the like has been that only a small amount of material being melted was maintained molten at any given time. Typically, the ingot was built up in a vertically extending generally cylindrical crucible, raw material being added at the top of the crucible throughout the ingot forming process. The rate of addition of raw material and the rate of heat supply were controlled so that only a small portion of the material in the crucible was liquid at any time. As the ingot built up in the crucible, it consisted of a solid ingot with a pool of molten material on its top, to which material being melted was continually added, and from which material was continually solidifying at the bottom of the pool.

With such methods, it is difficult to form an ingot of large dimensions having homogeneous composition throughout its body. In order to form an ingot of the best possible quality, a substantial volume of molten metal must be maintained molten and mixed just prior to pouring. The prior art methods were not capable of maintaining sufficient quantities molten and thoroughly mixing them to ensure the best homogeneity of the ingot.

Another object of the present invention is to provide a method for forming ingots of materials of the type described, in which the material for the entire ingot body is maintained molten and is poured in a molten state into a mold.

Another object is to provide a method of the type described, which is capable of holding in a molten state a quantity of metal sufficient to cast a sizable object in a shape or form other than a cylindrical ingot.

A further limitation of the prior art methods for forming ingots from titanium and the like is that the superheat of the titanium was limited and also was not closely controllable. By superheat is meant the difference between the melting point of titanium and the higher temperature at which it is maintained in the furnace.

A further object of the invention is to provide an improved method for forming ingots of titanium and the like, in which a meltable material may be maintained, in substantial volume, at temperatures considerably above its melting point, just prior to pouring.

It has been proposed to construct furnaces for the melting of titanium and the like, which have been termed "skull" furnaces from the fact that the crucible in which the material was melted utilized as a liner, a thick, hollow, hemispherical layer of material being melted. Such a layer is referred to as a "skull." Commonly, the skulls in the prior art furnaces have been rather thin (about 1" thick), and no attempt has been made to control the skull thicknesss during the melting operation. In the previous methods and apparatus using skulls, the crucible has been formed of refractory material or the like, having low thermal conductivity.

Another object of the present invention is to provide a method in which the thickness of the skull may be controlled during the melting operation. A further object is to provide a method in which the skull thickness is controlled by using a cooled copper shell for the crucible, and balancing the heat input through the arc against the heat extracted through the shell.

The foregoing and other objects of the invention are attained in the method described herein. Typically, the method is used with apparatus which comprises a crucible located inside a sealed enclosure. Means is provided for evacuating the enclosure. The crucible is tiltable so that material melted in it may be poured from it into one or more molds which are also located inside the enclosure. For the purpose of charging the crucible, the enclosure may be opened and the crucible loaded with titanium in a convenient form, either sponge or scrap. The enclosure is then closed and evacuated and an arc is struck between a consumable electrode and the material in the crucible. The consumable electrode continues to add material to the crucible as long as its arc is maintained, and is effective to melt down the material in the crucible.

The crucible with which the method is used may comprise an outershell of copper or other material having high thermal conductivity, and a skull of the material being melted, which skull is built up and maintained at the inner surface of the shell, by the use of cooling means on the outside of the shell. The skull must have an appreciable thickness and be strong enough to contain the melt. The melting with the consumable electrode continues until all the material originally supplied and that added by the consumable electrode has been melted into a large unitary mass which fills the crucible to a desired level. The arc from the consumable electrode is then extinguished and it is withdrawn. In its place a plurality of non-consumable electrodes are moved into arcing relationship with the surface of the liquid mass. The power supplied to these electrodes is controlled to determine the temperatures developed in the mass of the material. The heat loss from the outside of the mass of material through the solid skull and the shell is controlled by controlling the temperature of the coolant; (a certain amount of heat is also lost by radiation from the liquid surface), and the heat supplied to the mass is determined by the power supplied through the non-consumable electrodes. The equilibrium temperature and thus the degree of superheat maintained in the mass, and the thickness of the skull, may be readily controlled by so controlling the heat supply and heat loss.

In order to prevent contamination of the ingot and to refine the melt by the extraction of hydrogen, it is highly desirable to maintain a high vacuum in the furnace. From the standpoint of purity, the vacuum should be somewhat higher than that which produces the best arc characteristics. In order to enable the use of such high vacuum without adversely affecting arc characteristics, the non-consumable electrodes are made hollow and a continuous supply of an inert gas, e.g., a mixture of argon and helium, is supplied through the hollow electrodes so that the pressure conditions in the immediate neighborhood of the arc are raised somewhat above the highly evacuated conditions elsewhere in the furnace.

In order that the molten material in the crucible may be thoroughly mixed, there is provided a coil encircling the outside of the crucible, which is supplied with direct electric current sufficient to establish a vertically extending magnetic field throughout the crucible. This field reacts with the currents flowing through the molten material in the crucible so as to stir that material continuously in one direction, thereby keeping it well mixed while preventing the formation of eddies or the like which might result in the formation of stationary portions of the material.

After the material has been brought to a desired degree of superheat and maintained there for a desired length of time, the material in the crucible is poured into a mold or molds located within the enclosure. The pouring is accomplished by withdrawing the non-consumable electrodes and tilting the crucible so that the material therein pours over a suitably formed pouring spout or lip into the mold. The fulcrum about which the crucible tilts is preferably located near the spout so that the path of the pouring stream remains nearly the same throughout the pour.

Other objects and advantages of the invention will become apparent from a consideration of the following specification and claims, taken together with the accompanying drawings.

In the drawings:

FIG. 1 is a vertical sectional view of an ingot forming furnace which may be used to carry out the invention;

FIG. 2 is a vertical sectional view of one of the non-consumable electrodes in the furnace of FIG. 1;

FIGS. 3 to 9 show diagrammatically, successive steps in the process of forming an ingot using the furnace of FIG. 1.

According to the method disclosed herein, the furnace is loaded by first placing a quantity of scrap or sponge in the crucible while the crucible is open to the atmosphere. The furnace is then closed and evacuated. An arc is then struck between a consumable electrode and the material in the crucible. This arc is effective to melt down that material and to add further material. After the original charge is all melted, the consumable electrode is withdrawn and the temperature of the melt is further raised by the use of non-consumable electrodes.

FIGS. 1 AND 2

There is shown in FIG. 1, a furnace comprising an enclosure or tank 1 of generally circular horizontal cross-section. The enclosure 1 is provided with an outlet connection 2, which is connected to a vacuum pump, not shown, by means of which the pressure inside the enclosure 1 may be reduced to and maintained at a sub-atmospheric pressure. The enclosure 1 is provided with a cover plate 3. Projecting upwardly from the center of the cover plate 3 is an electrode tube 4 for receiving a consumable electrode 5 of the material to be melted. The upper end of the electrode 5 is gripped by a holder shown diagrammatically at 6 and attached to the lower end of a lead screw 7 driven by a rotating nut 8 which is operatively connected, as shown diagrammatically in the drawing, to a motor 9.

The lead screw 7 is hollow, and water or other suitable liquid coolant is circulated through it by means of hose connections 10 and a coupling 11. Electricity is conveyed to the electrode 5 by means of brushes 12 which engage the ends of the rotating nut 8 and which are connected through suitable connectors to terminals 13 located on the outside of the electrode tube 4.

The lower end of the electrode 5 projects downwardly into a crucible 14, comprising a cylindrical shell 14a, whose structural details may be similar to that shown in U.S. Patent No. 2,950,094 granted August 23, 1960, to Robert J. Garmy, and a skull 54 within the shell. The crucible 14 has cooling jackets 15 and 16 on its bottom and sides, respectively, through which water or other suitable coolant may flow. The crucible 14 also has a coil 17 for arc stabilizing and stirring purposes as shown in U.S. Patent No. 2,800,519 granted July 23, 1957 to Robert J. Garmy. One side of the crucible 14 is provided on its upper end with a pouring spout 18 which may be constructed of graphite.

Inside the furnace enclosure 1 and above the crucible 14 there are provided three non-consumable electrodes 28, the details of which are shown in FIG. 2. Referring to that figure, it may be seen that each electrode 28 comprises a tip 29, an internally threaded coupling member 30 and a power supply tube 13. The tip 29, which may be either of graphite or tungsten, is hollow to provide a central passage 29a. The upper end of the tip 29 is externally threaded to fit internal threads on one end of the coupling 30. The coupling 30 has a central aperture 30a aligned with the passage 29a and in fluid communication with it. A gas supply pipe 32 projects into the coupling 30 and has its lower end extending into the aperture 30a. Pipe 32 is concentric with the power tube 31. Another cylindrical tube 33 is concentric with the tube 31 and the gas supply tube 32 and lies between those two tubes. The tube 33 has its lower end terminating short of the bottom of the upper threaded recess in the coupling 30, so that coolant liquid may flow downwardly through the tube 33 and upwardly between the space between tube 33 and power tube 31. The lower end of the tube 31 is externally threaded to engage the internal threads on the coupling 30.

The upper end of the tube 31 is provided with coolant supply and drain couplings and with suitable current supply couplings. These couplings are not shown in the drawings, and may be generally similar to those shown in Garmy Patent No. 2,800,714, mentioned above.

An auxiliary non-consumable electrode 34 is provided, generally similar in structure to the electrodess 28. The electrode 34 includes a power tube 35, which extends upwardly through the cover 3 and has its upper end attached to a carriage 36 supported by means of traveling nuts on a lead screw 37 driven by a motor 38. The electrodes 28 and power tubes 31 are driven by similar motors and supporting mechanisms, which have been omitted from the drawing for the sake of clarity.

Within the enclosure 1 and aligned with the pouring spout 18, there is provided a turntable 39 which supports a plurality of molds 40 and 41. The mold 40 is generally similar in structure to the crucible 14, having water cooled sides and base to provide for rapid chilling of the molten material poured into it. The mold 41 is of more conventional structure, being formed of graphite or the like. Each mold may have a target plate 42, 43 in its bottom formed of the same material which is to be poured into it. The enclosure 1 is provided with access doors 44 on either side, by means of which access may be gained for removal of the molds 40 and 41 and the ingots poured therein. The upper side of the enclosure 1 is provided with a tube 45 closed at its outer end by a glass 46, through which the operation of the mechanism inside the enclosure may be observed. The entire enclosure 1 is mounted in a thick walled chamber, one of whose walls is shown at 47 in FIG. 1. A heavy observation window 48 is provided in the wall 47. Suitable control mechanism for the furnace is located outside the window 48.

Suitable means (not shown) may be provided for feeding supplementary scrap or sponge material through a conduit 51 which extends through the upper side of the enclosure 1. See for example the means disclosed in Patent No. 2,800,714 mentioned above.

FIGS. 3 to 9

These figures illustrate diagrammatically the improved method for forming ingots using the apparatus of FIGS. 1 to 2. The apparatus shown in these figures consists of a crucible 14 having a side wall water jacket 16 and a base water jacket 15.

The first melting run with a given crucible shell is utilized to form a skull which is used on later melting runs of material having the same composition.

For the first melt, there is placed in the bottom of the crucible shell a preformed slab 52 of titanium or other metal to be melted, as shown in FIG. 3. Upon the slab 52 there is loaded a supply of material to be melted, as shown at 53 in FIG. 4. This load may consist entirely of scrap, or it may be scrap mixed with titanium sponge. After the crucible is so loaded and the furnace evacuated, the consumable electrode 5 is lowered to the position shown within arcing distance of the scrap 53 and an arc is started, thereby melting the scrap, and also melting the electrode 5 gradually. The molten material from the arc flows down over and melts the unmelted material. Smaller arcs are developed at this time throughout the pile of scrap and sponge which are also effective in melting the material. This phase of the process commonly proceeds with much turbulence, sputtering and splattering of the molten material. Throughout this phase, the molten material is stirred by the action of the coil 17.

The process just described is capable of melting down titanium scrap in whatever shape or condition it may be, so long as the pieces are small enough to be received in the crucible. Several factors are present which promote the melting action, including: (1) the small local arcs formed between the abutting pieces of scrap; (2) the major arc formed between the consumable electrode and the pile of scrap; and (3) the molten material flowing from the major arc down over the other pieces. While the melting may be successfully accomplished without the use of the stirring coil, it has been found that the stirring coil speeds the melting process considerably.

All of the material supplied to the crucible eventually is melted and most of it solidifies again as a solid body of titanium, shown in FIG. 5 at 54, having a small molten pool of titanium 55 in its upper surface. After this condition is reached, the consumable electrode 5 is withdrawn, and the nonconsumable electrodes 28 are lowered so that their tips 29 are adjacent the surface of the pool. Arcs are struck at those electrodes and are supplied with electrical energy sufficient to melt a substantial portion of the titanium in the crucible, lowering the liquid-solid interface to the line indicated at 56 in FIG. 6 which, at the center, is close to the position of the upper surface of the original slab 52 of FIG. 3. The temperature maintained in the pool 55 and the thickness of the solid titanium body 54 may be controlled by regulating the heat supplied by controlling the amount of power supplied through the electrode tips 29, and regulating the heat loss by controlling the flow of coolant through the cooling jackets 15 and 16. After a desired volume of titanium has been brought to the liquid condition in the pool 55 and raised to a suitable degree of superheat, the three electrodes 29 are withdrawn, and the auxiliary electrode 34 is lowered adjacent the pouring spout of the crucible to melt away the solid material which may be clogging that spout, as shown in FIG. 7. If desired, the auxiliary electrode 34 may be brought into action before the electrodes 29 are withdrawn. During all the foregoing operation, current is maintained flowing in the stirring coil 17 to keep the pool agitated so that the composition of the pool is homogeneous. After the material near the pouring spout has been melted, the crucible is tilted by suitable mechanism included in the supporting frame 19, and not shown in the drawing, so that the pool 55 is poured into the mold 40, as shown in FIG. 8. After the pouring is completed, the material in the crucible 14 has the structure shown in FIG. 9. The titanium body 54 in the crucible roughly conforms to the internal contour of the crucible, and is known as a "skull." It is allowed to remain in that contour and subsequent loads of material are deposited within the skull 54, rather than on a slab such as shown at 52 in FIG. 3.

While we have shown and described certain preferred embodiments of our invention, other modifications thereof will readily occur to those skilled in the art, and we therefore intend our invention to be limited only by the appended claims.

We claim:
1. The method of forming an ingot of meltable charge material comprising:
 (a) melting the charge material in a crucible by supplying electric current to the charge material through a consumable electrode of the meltable material;
 (b) withdrawing the consumable electrode;
 (c) advancing a non-consumable electrode;
 (d) thereafter superheating the molten charge material substantially above its melting point by supplying electric current to the charge by means of the non-consumable electrode without adding further meltable charge material;
 (e) withdrawing the non-consumable electrode; and
 (f) pouring the superheated material into a mold.

2. The method of forming an ingot of meltable material comprising:
 (a) melting the material in a crucible of thermally conductive material by supplying electric current to the meltable material through a consumable electrode of the meltable material located within and spaced from the walls of the crucible;
 (b) cooling the outside surface of the crucible to form and maintain adjacent the inside surface thereof a skull of the material being melted;
 (c) withdrawing the consumable electrode;
 (d) advancing a non-consumable electrode to a position located within and spaced from the crucible walls;
 (e) thereafter superheating the molten material substantially above the melting point by supplying electric current to the meltable material through the non-consumable electrode;
 (f) stirring the molten material by supplying electric current to a coil disposed about the crucible;
 (g) controlling the supply of current to the electrode and the cooling of the outside of the crucible throughout the melting and superheating steps to regulate the thickness of the skull; and
 (h) thereafter pouring the superheated material into a mold.

3. The method of forming an ingot of meltable charge material comprising:
 (a) melting the charge material in a crucible by supplying electric current to the charge material through a consumable electrode of the meltable charge material;
(b) continuing the melting until all turbulence and splatter cease;
(c) withdrawing the consumable electrode;
(d) advancing a non-consumable electrode;
(e) thereafter superheating the molten charge material substantially above its melting point by supplying electric current to the charge by means of the non-consumable electrode without adding further meltable charge material;
(f) withdrawing the non-consumable electrode; and
(g) pouring the superheated material into a mold.

References Cited by the Examiner
UNITED STATES PATENTS

| | | | |
|---|---|---|---|
| 1,294,837 | 2/1919 | Von Schlegell et al. | 13—34 |
| 2,541,764 | 2/1951 | Herres et al. | 13—9 |
| 2,686,822 | 8/1954 | Evans et al. | 13—9 X |
| 2,734,244 | 2/1956 | Herres | 22—214 |
| 2,782,245 | 2/1957 | Preston | 13—9 |
| 2,789,152 | 4/1957 | Ham et al. | 13—9 X |
| 2,825,641 | 3/1958 | Beall et al. | 75—10 |
| 2,828,199 | 3/1958 | Findlay | 75—29 |

J. SPENCER OVERHOLSER, *Primary Examiner.*

V. K. RISING, *Assistant Examiner.*